Figure 1:
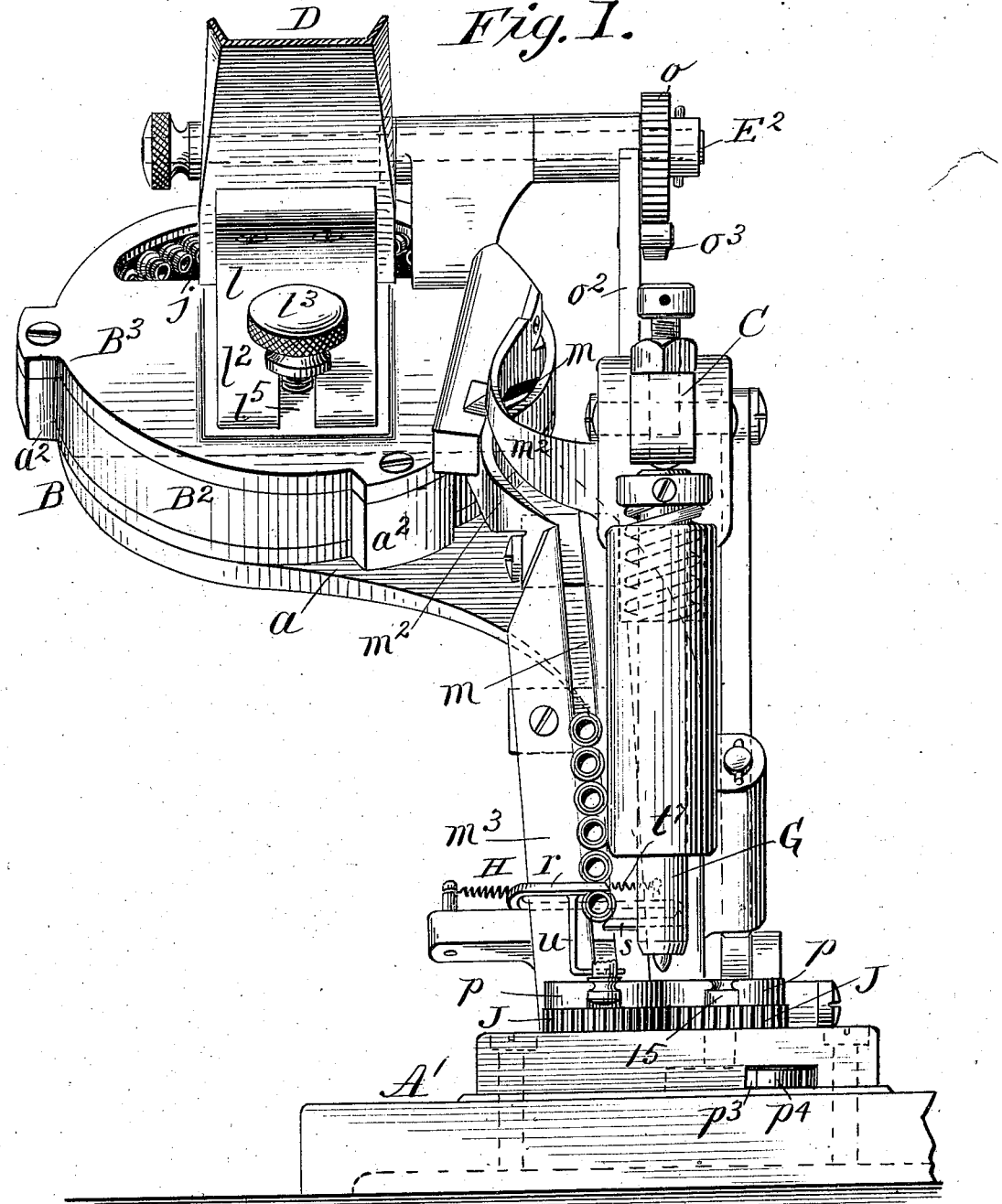

(No Model.) 7 Sheets—Sheet 1.

C. E. VAN NORMAN.
SETTING LACING STUDS, EYELETS, &c.

No. 502,894. Patented Aug. 8, 1893.

Witnesses:

Inventor,
Chas. E. Van Norman.
by Chapin & Co.
Attys.

(No Model.) 7 Sheets—Sheet 2.

C. E. VAN NORMAN.
SETTING LACING STUDS, EYELETS, &c.

No. 502,894. Patented Aug. 8, 1893.

Witnesses:
J. L. Garfield
T. F. Deneen

Inventor:
Chas. E. Van Norman,
by Chapin & Co., Attys.

(No Model.)  7 Sheets—Sheet 3.

C. E. VAN NORMAN.
SETTING LACING STUDS, EYELETS, &c.

No. 502,894.  Patented Aug. 8, 1893.

Witnesses:

Inventor:
Chas. E. Van Norman,
by Chapin & Co.
Attys.

(No Model.) 7 Sheets—Sheet 5.

C. E. VAN NORMAN.
SETTING LACING STUDS, EYELETS, &c.

No. 502,894. Patented Aug. 8, 1893.

Witnesses:
J. D. Garfield
F. F. Deneen

Inventor,
Chas. E. Van Norman
by Chapin & Co.
Attys.

(No Model.) 7 Sheets—Sheet 6.

C. E. VAN NORMAN.
SETTING LACING STUDS, EYELETS, &c.

No. 502,894. Patented Aug. 8, 1893.

Witnesses:
J. D. Garfield
T. F. Deneen

Inventor
Chas. E. Van Norman,
by
Chapin & Co.,
attys.

(No Model.)   7 Sheets—Sheet 7.

C. E. VAN NORMAN.
SETTING LACING STUDS, EYELETS, &c.

No. 502,894.   Patented Aug. 8, 1893.

Witnesses:
J. D. Garfield
T. F. Deneen

Inventor:
Chas. E. Van Norman
per Chapin & Co.
Atty.

UNITED STATES PATENT OFFICE.

CHARLES E. VAN NORMAN, OF SPRINGFIELD, MASSACHUSETTS.

SETTING LACING-STUDS, EYELETS, &c.

SPECIFICATION forming part of Letters Patent No. 502,894, dated August 8, 1893.

Application filed February 29, 1892. Renewed February 2, 1893. Serial No. 460,784. (No model.)

*To all whom it may concern:*

Be it known that I, CHARLES E. VAN NORMAN, a citizen of the United States, residing at Springfield, in the county of Hampden and State of Massachusetts, have invented new and useful Improvements in Machines for Setting Lacing-Studs, Eyelets, &c., of which the following is a specification.

This invention relates to improvements in machines for setting lacing studs upon the vamps of boots or shoes, and, in general, to machines for feeding down and setting eyelets, and analogous articles.

The invention particularly relates to improvements in the hopper into which the lacing studs may be promiscuously received and to the conveyer way applied relative to the hopper whereby the studs may be brought to uniform positions in the hopper and thence moved into the said conveyer way to be guided to the setting mechanism; also to the mechanism for delivering into the hopper the lacing studs in such quantities as are substantially proportionate to the delivery of studs to be set; also to devices between or relative to the conveyer way and the setting mechanism for periodically delivering the studs one at a time from said way and for effecting their disposition to be subject to the action of the setting mechanism,—and otherwise to features of improvement in the machine as will hereinafter more fully appear.

The invention consists in constructions and combinations of parts and devices for conjoint actions all substantially as will hereinafter more fully appear and be set forth in the claims.

Figure 2:
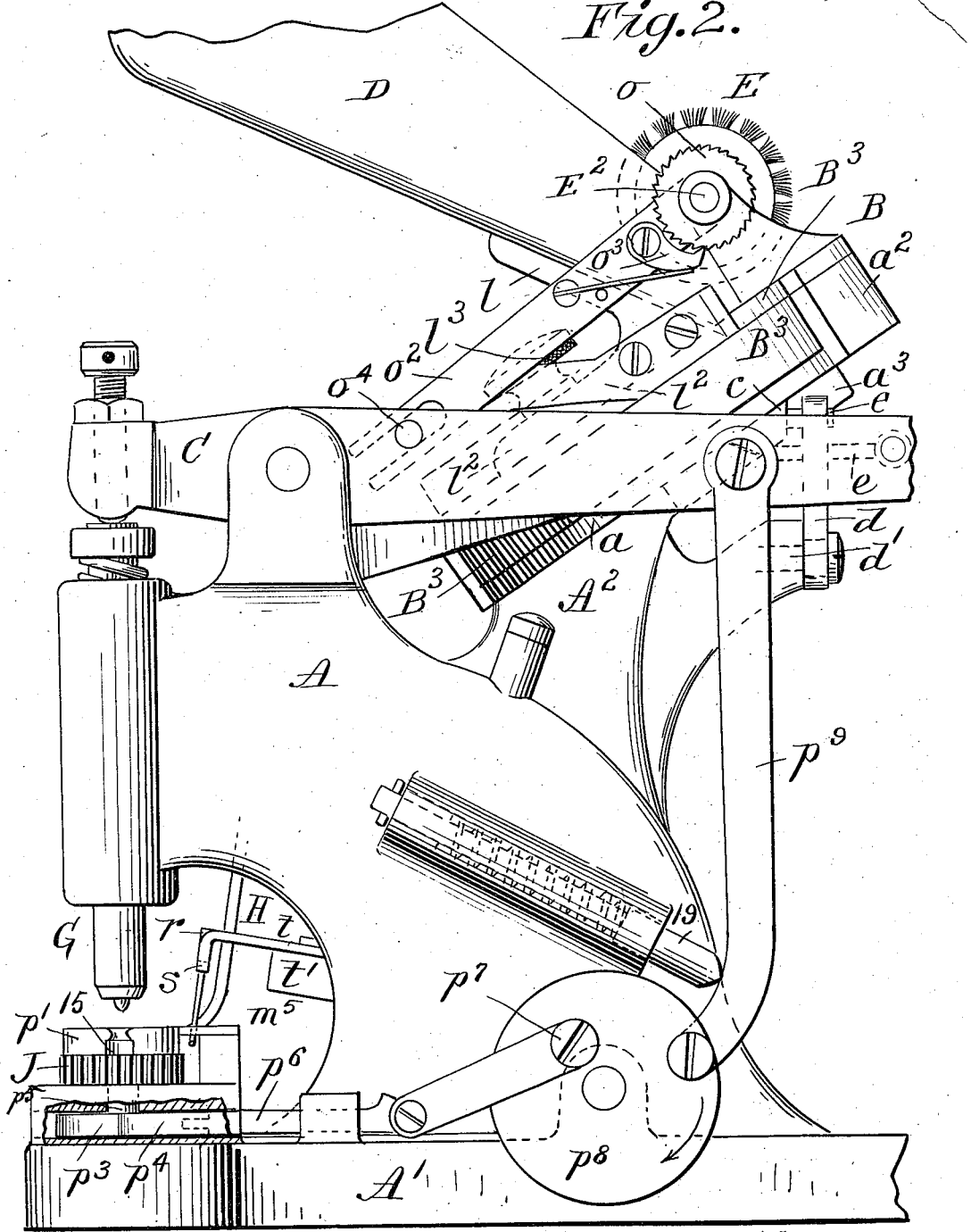
Figure 3:
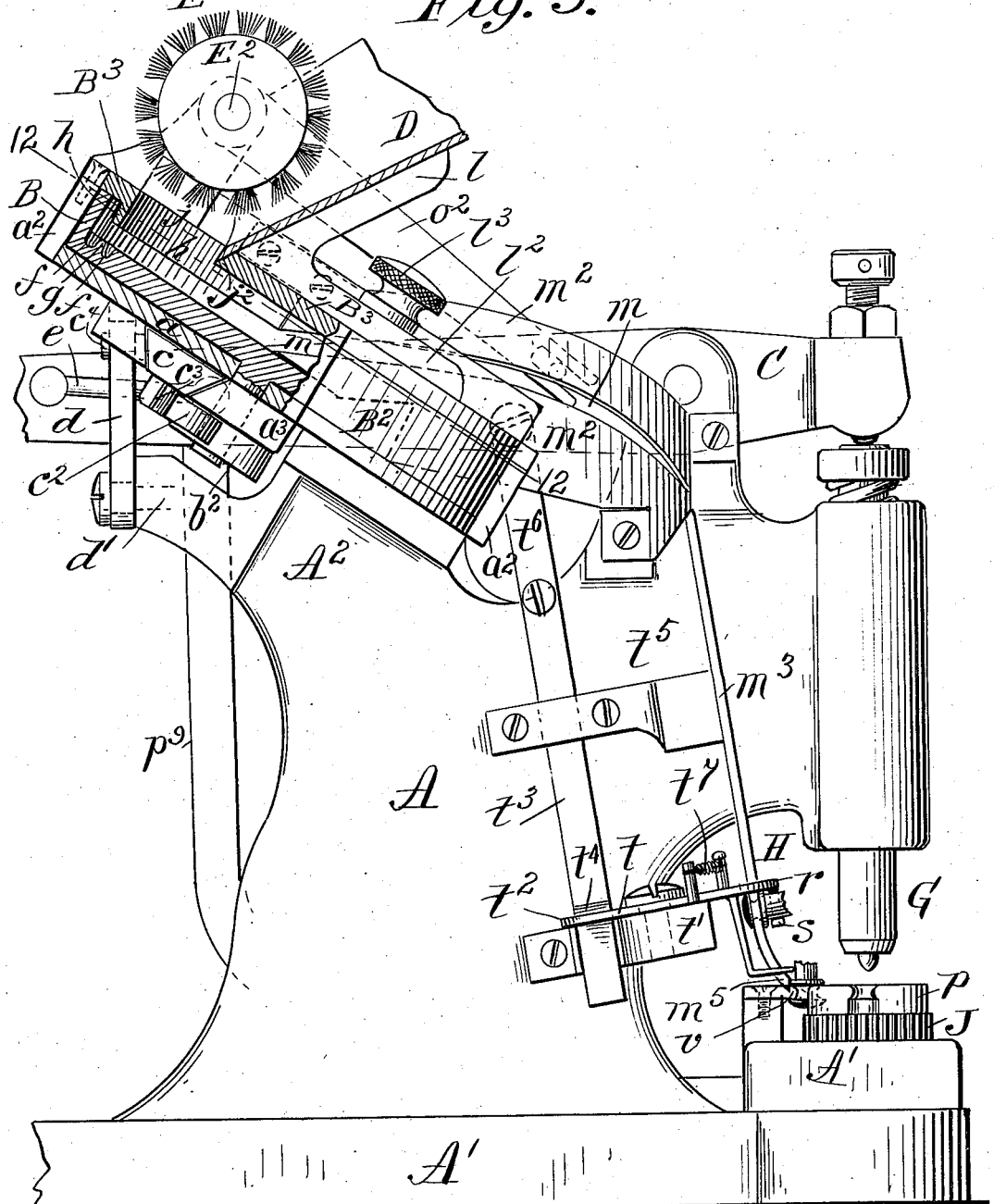
Figure 4:
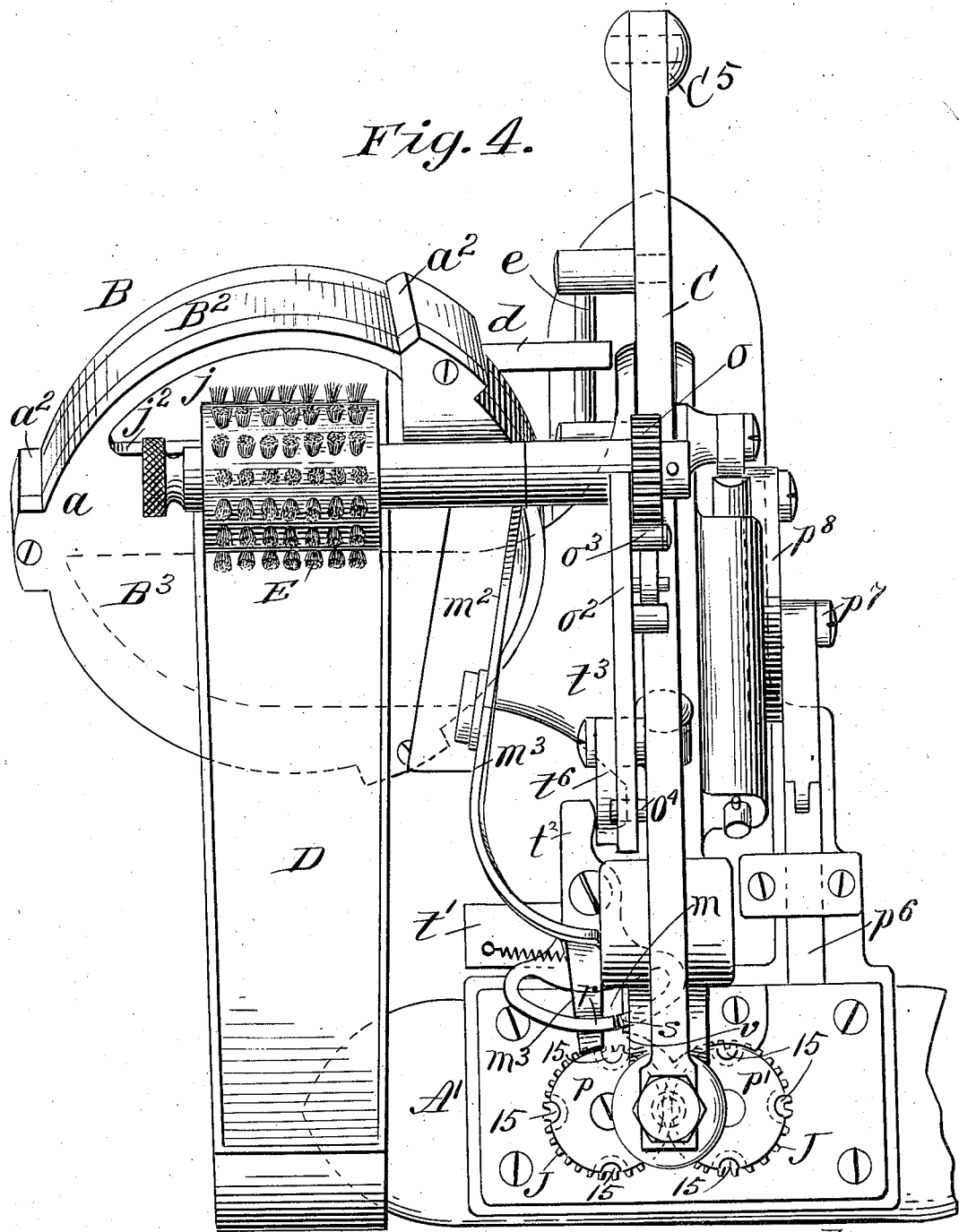
Figure 5:
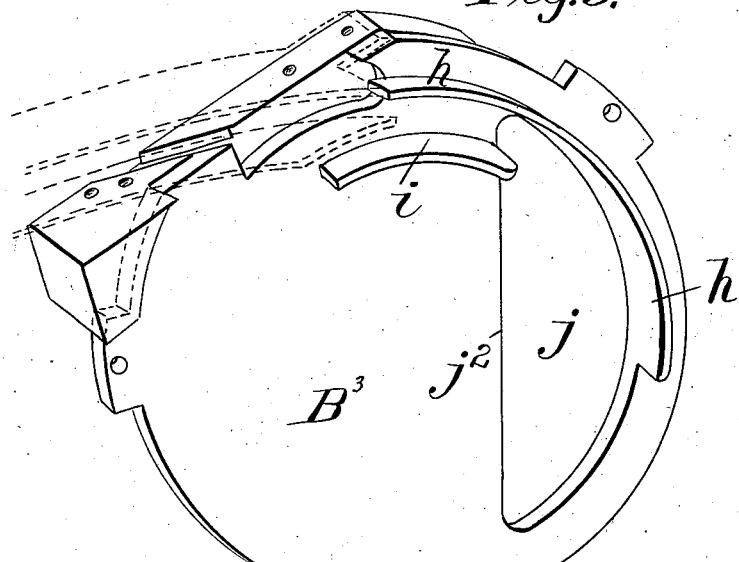
Figure 6:
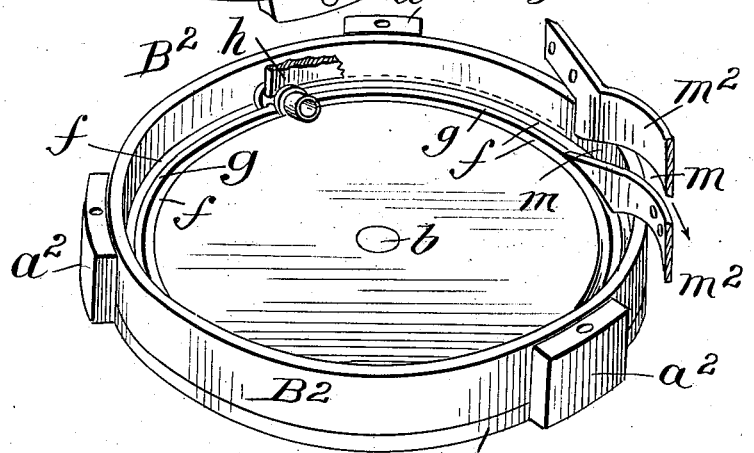
Figure 7:
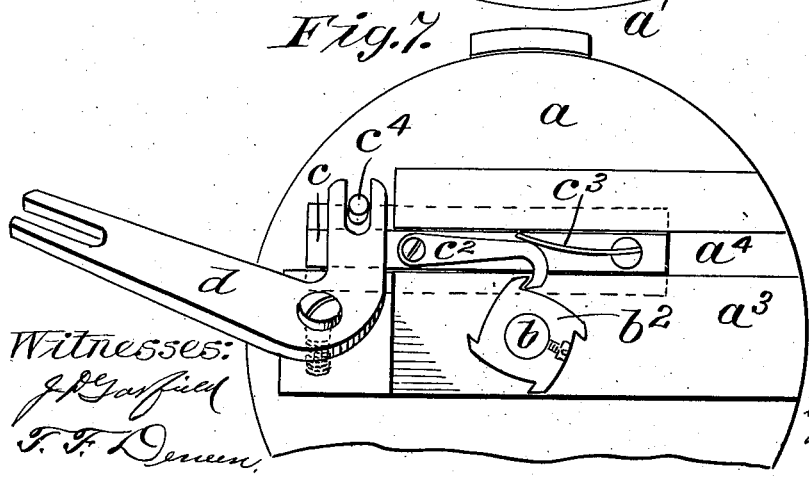
Figure 8:
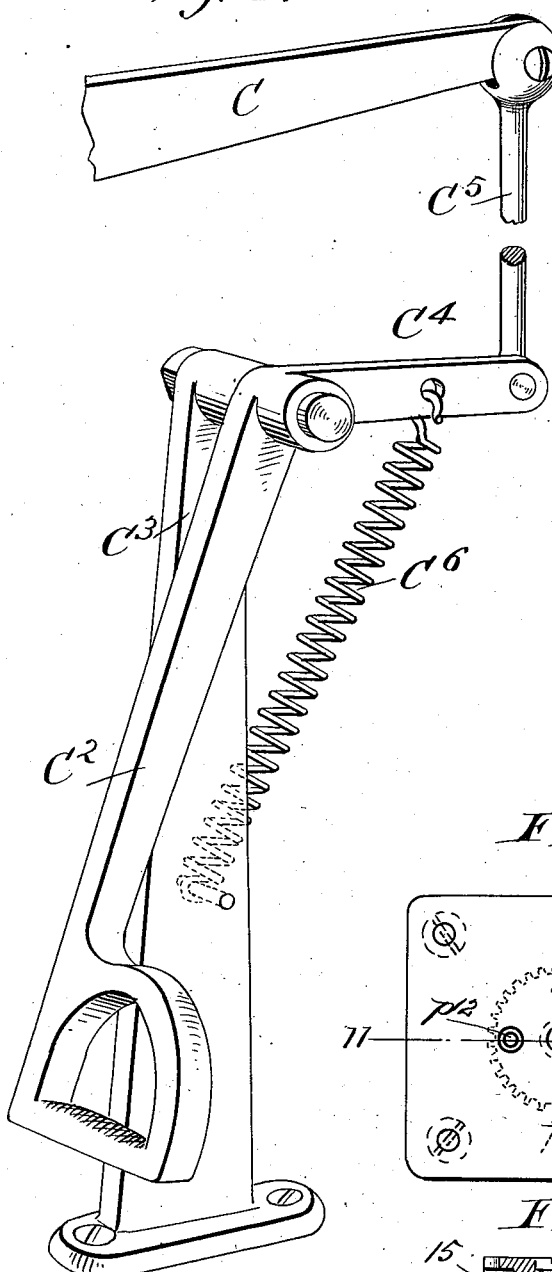
Figure 9:
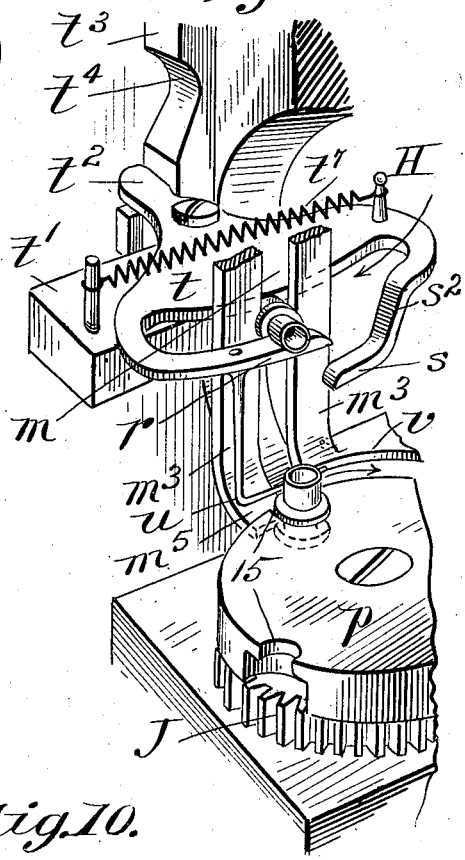
Figure 10:
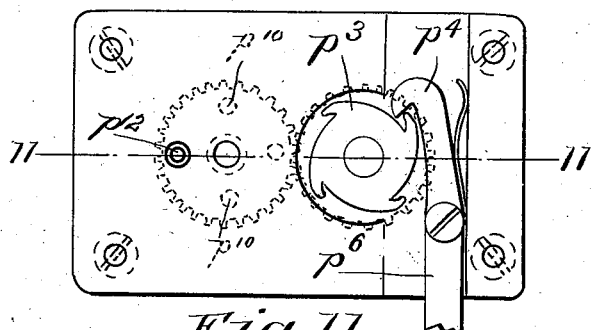
Figure 11:
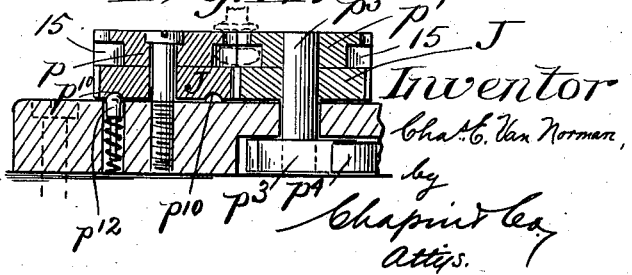
Figure 12:
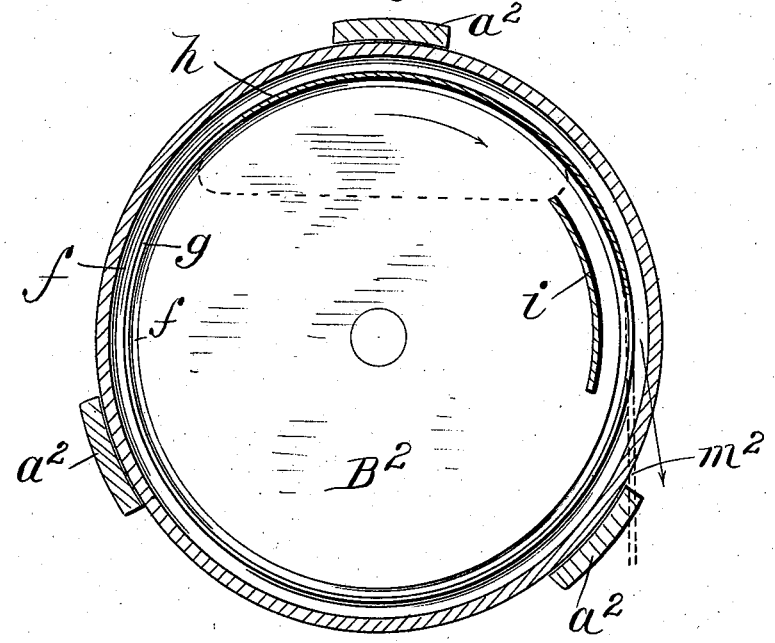
Figure 13:
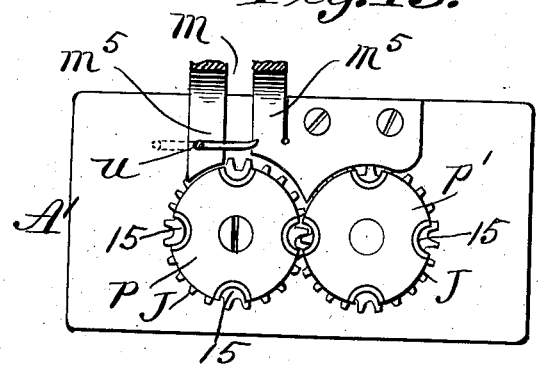

Referring to the accompanying drawings in which the machine of the present invention is illustrated and in which similar characters of reference indicate corresponding parts in all the views, Figure 1 is a front elevation of the machine. Figs. 2 and 3 are elevations of the same at opposite sides thereof, the latter view being partially in section, and Fig. 4 is a plan view of the machine. Figs. 5 and 6 are perspective views of the stationary and movable parts of the hopper shown as separated from each other and Fig. 7 is a view of the hopper rotating mechanism. Fig. 8 is a perspective view of the mechanism for operating the common or working lever of the machine. Fig. 9 is a perspective view of a part of the stud guiding device, the stud separator or escapement mechanism and the movable stud receiving disk and other coacting parts. Fig. 10 is a bottom plan view of the rotating mechanism for the stud receiving and clamping disks. Fig. 11 is a vertical sectional view on line 11, Fig. 10. Fig. 12 is a sectional and plan view through the hopper taken on the plane indicated by the line 12—12, Fig. 3. Fig. 13 is a plan view of the stud conveying and confining parts beneath the setting tool.

This improved machine is constructed with particular reference to the feeding of lacing studs of a form substantially such as is shown in Figs. 1, 3, 6 and 9, such stud having a circular neck under the rounded head, and an annular shoulder between the neck and the tubular shank. However, to those versed in the art to which this invention pertains, certain of the features of improvements will be recognized as capable of advantageous employment in machines for feeding and setting eyelets, rivets, and the like.

In the drawings A represents the frame or standard of the machine rising from the base, A', and having the rigid arm, A², supporting, rearwardly and laterally of said standard, and in a downwardly and forwardly inclined position, the plate, $a$, on which the hopper, B, is supported.

The hopper, B, comprises a shallow dish-shaped portion, B², clearly seen in Fig. 6, which is rotatable, and the top inclosure, B³, which is held fixed over the said portion, B², by the blocks or lugs, $a^2$, which are upwardly extended from the said supporting plate, $a$, outside of the periphery of the rotatable hopper section, B².

From the base of the rotatable hopper section, B², there extends axially and downwardly a rigid stud, $b$, through the supporting plate, $a$, at the thickened portion thereof receiving on its lower end the ratchet wheel, $b^2$. The said thickened part, $a^3$, of the plate, $a$, has the dove-tailed way, $a^4$, therein in which is the slide, $c$, which carries the working pawl, $c^2$, that is by the spring, $c^3$, held in engagement with the ratchet wheel, $b^2$.

The slide, $c$, is given a reciprocatory motion,—thereby imparting rotary motion to the rotatable hopper, $B^2$,—by means as follows: The slide has a stud, $c^4$, which is engaged by the slotted end of one arm of an angular lever, $d$, which at its elbow is pivotally supported on an extension of the bracket arm, $A^2$, as seen at $d'$, in Figs. 2 and 3. The other arm of this angular lever which is also slotted is projected in a direction angularly to and alongside of the vertical plane of swinging movement of the common or main operating lever, C, of the machine. The said lever has the fixed off-set rod, $e$, with which the said angularly extended arm of the lever, $d$, engages. The vertical rocking or swinging movement of the said lever, C, imparts the corresponding swinging movement to the angular lever and consequently, through the pawl-and-ratchet devices, the rotary movement to the hopper.

The movable section of the hopper has in its base two adjacent grooves, $ff$, with the dividing rib, $g$, the outer groove being essential and at or quite close to the inner periphery of the circular hopper wall, while the inner groove, though very desirable and advantageous and preferably to be provided, as thereby allowing the better disposition of the studs and retention thereof in their radial positions as they are moved forwardly and upwardly in the hopper is not absolutely necessary to a fairly efficient operation of the machine.

The stationary top part, $B^3$, of the hopper is provided with the arc shaped downwardly projecting flange, $h$, which ranges over the said rib, $g$, and at a distance therefrom corresponding to the diameter of the neck of the lacing studs. The fixed hopper section, $B^3$, also has a downwardly projecting guard, $i$, the relation of which to the entrance opening, $j$, into the hopper and to the flange, $h$, and hopper outlet way, $m$, is more clearly indicated in Fig. 12 and all, as will be understood, arranged so that the lacing studs which may be entered promiscuously through the opening, $j$, will be prevented from coming into an obstructing position relative to the outlet or delivery way of the hopper which is continued in the forwardly and downwardly extended conveyer way, $m$. The lacing studs are placed in considerable quantities in the inclined chute or hopper, D, which has its downwardly inclined delivery extremity terminated at the opening, $j$, of the hopper, D. This hopper, D, is fixed to the angular-shaped bracket, $l$, the member, $l^2$, of which has the slot, $l^5$, longitudinally thereof through which the shank of the set screw, $l^3$, passes and enters with a screw engagement into the top closing hopper section, $B^3$, and bears by the shoulder under the head upon the said bracket member, $l^2$.

There is a circular rotary brush, E, mounted at the delivery end of the chute-hopper, D, with its periphery slightly above the bottom of said hopper. This brush serves as a species of gate to permit the passage from the chute hopper into the hopper, B, of the studs at a rate practically corresponding to the rate of delivery from said latter hopper for being set. The brush has an intermittent rotary motion, the same being imparted by the mechanism which will be pointed out as follows: On the supporting arbor, $E^2$, for the brush there is a fixed ratchet wheel, $o$, adjacent which and surrounding said arbor is the hub of the pawl-carrying-arm, $o^2$, the spring pressed pawl, $o^3$, thereon engaging the said ratchet wheel, $o$. As the aforesaid main or operating lever, C, swings, the stud, $o^4$,—which is thereon and which engages the slotted extremity of the pawl carrying lever, $o^2$,—imparts the reciprocating motion to the latter and consequently the rotary motion to the brush. The chute-hopper, D, is, by the form of connection shown between its bracket and the top of hopper, B, adjustable so that its bottom will be nearer or farther from the brush to correspond with wear of the brush, or different sizes of studs, which it may become desirable to feed down. The studs entered into the hopper, B, roll or slide down on the inclined bottom thereof and are spread thereover, in a single layer, the distance between the upper and lower walls of this hopper being considerably less than twice the diameter of a lacing stud whereby one stud cannot lie sidewise upon another. In fact the distance between the base of the hopper section, $E^2$, and the lower side of the inclosing section, $B^3$, is slightly less than the axial length of the lacing stud all whereby such studs as may stand endwise on entering the hopper through the opening, $j$, will, by the edge, $j^2$, as the studs are caused to gravitate down the inclined hopper base, be overturned to lie on their sides. Now it will be understood that such of the studs,—entered and distributed in a layer at the lower inclined portion of the hopper base,—as have their axes radial from the center of the hopper and which are over the grooves, $ff$, and rib, $g$, will by such grooves and rib have such radial relations maintained and as the hopper is rotated, the studs by their frictional contact with the part of the hopper on which they rest, and by the other studs which may come into positions behind them, are forced up and around to the upper portion of the hopper and have their necks engaged by the flange, $h$, whereby they become positively held against any displacement and must continue around to the exit way, $m$, at the side of the hopper which is opposite that at which the said flange, $h$, has its beginning. It will be manifest that if the tubular shank-end of the radially arranged stud in the hopper is over the double grooved portion thereof which is adjacent the circular hopper-wall, such stud will then not be engaged at its shoulder which is at the side of the neck farthest from the hopper axis and as the stud is upwardly moved on the next rotational impulse of the hopper it will free itself from any engagement with the border of the inner groove and roll or slide back to the lower part of the inclined hopper base. The said exit way is constituted by the curved strips or plates $m^2$, $m^2$, which lead horizontally and tangentially from the delivery side of the hopper and are thence continued in other separated and parallel edged strips or plates forwardly and downwardly as seen at $m^3$, $m^3$. The studs vertically guided down the way therefor with their axes horizontal as indicated in Figs. 1 and 9 are by a change of direction of the guideway-forming-strips indicated at $m^5$, caused as they slide out of the guideway, to come into an upright position, with their heads downward.

At the place at which the conveyer way, down which the studs are brought, terminates at the front of the machine, and supported above the base, A', there is one, $p$, of a pair of horizontal disks, $p\ p'$, each of which is carried as a rotating platform, at the upper side of a spur gear, J, the one of which gears meshes with the other. Each disk is of slightly less diameter than that of the spur gear thereunder which constitutes in substance an outwardly projecting base ledge or flange for the disk. Each disk has within its periphery an outward or edgewise opening pocket or depression, 15, which is contracted at its upper portion the more closely to conform to the neck above the head of the inverted stud. The said pockets or depressions are shown as arranged at quarters on the periphery of the disk and so as to have the one of each disk match with that of the other at every fourth of a rotation of the disks, such matching pockets constituting an inclosing socket for the head and the neck of the stud as indicated in the dotted lines in Fig. 11, the tubular shank being upwardly extended therefrom above the top of the disk, the riveting tool or punch, G, being axially thereover. The studs are freed one at a time so that they may slide out of the conveyer way while the disks, $p\ p'$, are at rest by an automatically operating and properly timed device indicated at H, and seen in Figs. 1, 2, 3, 4 and 9. This device embodies two fingers, $r$ and $s$, which are carried by a horizontally rocking plate, $t$, pivotally mounted on the lug, $t'$, of the standard, A. The plate, $t$, is located on said lug back of the lower vertical portion of the said conveyer way and has the finger, $r$, in the form of a curved member as shown forwardly extended from one side (here the left) of the plate and thence extended more or less nearly parallel with, and in advance of, the edge of said plate, $t$, and to move, as the plate moves, horizontally adjacent the front face of the strips, $m^3$, $m^3$, which constitute said way. The other finger, $s$, is similarly but oppositely extended forwardly from the front edge of the plate $t$, and at its right side and then extended parallel with said front edge but is downwardly off-set as at $s^2$, to terminate about under the end of the finger, $r$,—the vertical distance between the finger extremities being as great as the diameter of the stud. The finger carrying plate has a rearwardly extended lug, $t^2$, projected adjacent the vertically movable bar, $t^3$, which has in its face the cam-depression, $t^4$, said bar being constrained for a rectilinear reciprocating movement about vertically on the side of the frame standard, A, by the clip, $t^5$. The link, $t^6$, connects the said cam-faced slide bar with the common working lever, C. The spring, $t^7$, maintains the lug, $t^2$, always in working engagement with the said cam, $t^4$.

With a series of studs in the conveyer way above the device, H, on each reciprocating movement of the common working lever, C, the finger carrying plate, $t$, will receive its horizontal oscillating movements, and the forward parts thereof moving to the left will carry the finger, $r$, sidewise from under the tubular shank of the lowermost stud, the other finger, $s$, then being brought thereunder and temporarily supporting the stud. On the reverse movements of said fingers the one $r$, assumes a supporting position under the stud next above the one which had been previously supported thereby,—that stud, now having the support therefor constituted by the downwardly off-set finger, $s$, removed, is free to slide down the way and be deflected into the position with its shank uppermost and be adjacent the rear pocket, 15, of the disk, $p$. It will be seen that there is a downwardly extended and angular finger, $u$, projected below the intermediate part of the said finger, $r$, which as said finger moves to the right after a stud has been freed by the finger, $s$, to be permitted to come into position adjacent the rear pocket of the disk, $p$, has a slight forcing or restraining action on the shank of the stud, as will be apparent on a reference to Fig. 9, for forcing and temporarily holding the stud in the pocket so that at the commencement of the rotational movement or step of the disk, the stud will be held against displacement from the pocket, its position therein being thereby insured until the pocket and stud have come opposite the curved restraining plate, $v$. The edge of said plate, $v$, which faces the periphery of the disk, $p$, has such a separation therefrom as to form a free way for the shank of the stud which outwardly protrudes beyond the disk's periphery whereby the disposition of said stud in the pocket of the disk, $p$, is insured until that pocket oppositely registers with a pocket of the other disk, $p'$. The said curved plate in conjunction with the peripheral portion of the disk, $p$, opposite thereto forms a horizontal continuation of the conveyer way. The intermittent rotational movements of the geared disks are imparted at each forward and backward swinging movement of the aforesaid common lever, C, by means of the pawl, $p^4$, working on the ratchet wheel, $p^3$, which is fixed on the downwardly extended stud, $p^5$, of one of the disks. The pawl, $p^4$, is pivotally connected to the end of a reciprocating bar, $p^6$, that is linked to an eccentric stud, $p^7$, of a wheel or face plate, $p^8$. A pitman or connecting link, $p^8$, is connected to the said wheel, $p^8$, and to the said lever, C. A downward motion of the said lever insures the partial rotation of the said wheel in the direction of the arrow shown thereon securing an outwardly drawing of the pawl-carrying bar and consequently a quarter rotation of the ratchet wheel and both of the disks. The spring, $C^6$, applied on the actuating device for the lever, C, insures the retracting movement of the lever, C, and consequently of the said pawl, $p^4$, so that the latter may take a new tooth of the ratchet wheel.

19 represents a spring-pressed stud or plunger exerting its force upon the connecting rod, $p^9$, so that as the bar, C, is forced into its normal position, there will be then a slightly reversed movement whereby the rod, $p^9$, will not be permitted to remain on the dead center. This is a mechanical expedient, however for which I make no claim of novelty. One of the disk gears has on its under side "at quarters" depressions, $p^{10}$, there being an upwardly spring-pressed detent stud, $p^{12}$, located in a vertical socket in the base-piece above which the disk gear rotates. As will be apparent the pockets, 15, of the two disks having been brought exactly together, the stud will snap into a restraining engagement in one of the depressions which at that instant is thereover, preventing then any movement of the disk by reason of momentum whereby the stud would be carried out from axial alignment with the riveting or eyelet setting tool. The next force positively imparted by the pawl-and-ratchet mechanism for the rotation of the disks will of course overcome the comparatively slight force exerted by the said detent stud which will then be no impediment to the next movement of the disks.

The riveting tool indicated at G, receives its vertical working movement against the retracting spring, $C^6$, therefor, by the downward swinging movement of the forward end of the said common lever, C, (which, as will by this time have been observed, imparts through the various mediums of connection the concurrent actuating movements of all of the improved parts or devices described.) The downward thrust of the forward arm of the lever, C, is, as plain, imparted by upwardly swinging its rear arm, a device therefor indicated in Fig. 8 to be operated by foot power, being adapted to the purpose although other devices may be substituted. Referring to the construction of said device, the foot operated arm, $C^2$, of an angular lever which is pivotally mounted on the standard, $C^3$, has its other arm, $C^4$, connected by rod or link, $C^5$, to the rear arm of the said lever, C.

For effecting the setting of the stud,—the properly perforated leather or fabric having been adjusted properly relative to the tubular shank whereby, the latter protrudes through the leather,—the arm, $C^2$, is rearwardly forced. The spring, $C^6$, exerts the retracting action upon the said foot operated lever.

What I claim is—

1. In a stud or eyelet setting machine the combination with a dish-shaped hopper having a circular groove in its bottom near its circular wall, of an arc-formed flange or rib at the top having its lower edge a short distance above the inner boundary of the groove, and an outlet and guide way leading from adjacent one end of said rib, substantially as described.

2. In a stud or eyelet-setting machine the combination with a rotatable dish-shaped hopper having in its bottom near its circular wall concentric grooves $f\ f$, separated by the rib, $g$, of a stationary arc-formed rib or flange having its lower edge a short distance above the inner boundary of the groove and an outlet way leading from adjacent one end of said arc-formed flange, substantially as described.

3. In a stud or eyelet-setting machine the combination with a dish-shaped hopper mounted for rotation with its bottom inclined and having in its bottom a circular groove, of a fixed arc-formed rib or flange having its lower edge a short distance above and substantially parallel with the inner boundary of the groove, and a guideway terminating at and leading outwardly from adjacent one end of said flange, and means substantially as described for imparting an intermittent rotary motion to the hopper, substantially as and for the purpose set forth.

4. In a stud or eyelet-setting machine the combination with a rotatable dish-shaped hopper having in its bottom a circular groove, of a fixed plate or lid above the rotatable hopper having an opening and provided with the depending rib or flange, and a depending guard as $i$, and a guide-way terminating adjacent the rib and leading outwardly from the hopper, substantially as and for the purposes set forth.

5. In a stud or eyelet-setting machine the combination with a plate or support, $a$, having the upwardly extended border lugs, $a^2$, of a dish shaped hopper, having a depending shaft projected through said support and provided with a ratcheted wheel, and having in its bottom a circular groove near its side wall, a stationary arc-formed rib above and at a short distance from the inner border of the said groove, a guide way leading from adjacent the end of the rib out from the hopper, and a working pawl mounted for a reciprocatory movement on the said support and means for imparting its movement thereto, substantially as described.

6. In a stud or eyelet setting machine the combination with a rotary stud arranging and delivering hopper having an opening therein and a conveyer way leading therefrom for the properly arranged studs, of a stud receptacle and chute mounted with its bottom inclined for delivering into the hopper opening and a rotatable brush or gate at the delivery end of said chute and having its circumferential portions at a slight distance above the chute bottom, and means substantially as described for imparting a rotary movement to the brush or gate substantially as described.

7. In a stud or eyelet setting machine the combination with a rotary hopper having an opening thereinto, of a stud receptacle and chute mounted with its inclined bottom for delivery into the hopper opening, and a rotatable brush or gate at the delivery end of said chute having its circumferential portion at a slight distance above the chute bottom, means substantially as described for imparting the rotary movement to the brush or gate and means substantially as described for confining the said receptacle-chute with its bottom in variable adjusted relations to the brush axis, substantially as and for the purpose set forth.

8. In a stud or eyelet setting machine the combination with a hopper having an entrance opening through its top, of the angular bracket, $l$, with the slotted member, $l^2$, the chute or receptacle, D, having its bottom secured to the other member of said angular bracket, the set screw, $l^3$, and the rotary brush, all arranged substantially as shown.

9. In a stud or eyelet setting machine the combination with a hopper having an upper entrance opening and an inclined receptacle and chute above the hopper, having an exit opening at its lower end for delivering into the hopper, of a shaft having a brush or rotary gate supported thereby within the chute near its bottom at its delivery end, and a ratchet wheel on said shaft a swinging operating lever, C, and a pawl and carrier therefor connected to said operating lever, substantially as described.

10. In a lacing stud setting machine the combination with stud supporting and centering devices and a reciprocating setting tool and a lever for operating the tool, of a suitable fixed support having thereon a rotatable dish-shaped hopper with a depending shaft or stud having thereon a ratchet wheel, and said hopper having in its bottom a circular groove near its side wall, a stationary arc shaped rib or flange having its lower edge at a short distance above the inner border of said groove a slotted way having one end adjacent the end of the flange and thence leading to the setting devices, a reciprocating pawl carrier movably supported on said hopper support and having the pawl, the angular lever engaging said pawl carrier and having the slotted arm, and a member on said operating lever which engages said arm, substantially as described.

11. In a stud or eyelet-setting machine the combination with a slotted guide way, of two fingers having their ends the one above the other, and said fingers extended from their superposed ends in opposite directions and adapted for concurrent reciprocatory movements adjacent and across the guiding direction of said way, and means substantially as described for imparting the movements to said fingers all whereby studs coming down the way will be released for delivery one at a time, substantially as described.

12. In a stud or eyelet-setting machine the combination with a slotted way of a plate pivotally mounted having two projecting fingers located with their ends the one above the other, and said fingers having a direction from their superposed ends in opposite directions, and an operating cam having an actuating engagement with said plate, substantially as described.

13. In a stud setting machine the combination with a slotted stud guide way of the plate, $t$, having the fingers, $r$ and $s$, with the end of one above that of the other, said fingers being from said ends oppositely extended and the plate having the lug, $t^2$, and the retracting spring, the slide bar, $t^3$, having the cam surface, $t^4$, and an operating lever connected to the cam slide-bar substantially as described and shown.

14. In a stud or eyelet setting machine, the combination with a stud conveyer way, of a pair of horizontal disks mounted for rotation, edge to edge, and both having uniformly spaced peripheral depressions, and one of said disks having its periphery in proximity to the terminal of the conveyer way, and means substantially as described, for imparting intermittent rotary movements to the disks, whereby a peripheral depression of one of said disks will periodically come adjacent such conveyer terminal, and whereby depressions of both disks will successively come into matching relations to constitute a stud surrounding and retaining pocket, a setting device, over, and in alignment with, the center of the matching disk depressions, and an arc formed surface slightly separated from the periphery of the receiving disk and extended from adjacent its stud receiving position to adjacent the stud setting position, substantially as described.

15. In a stud or eyelet setting machine the combination with a conveyer way for the studs having a downward inclination and having its direction at its terminal deflected to deliver the studs axially vertical, of a horizontal disk having in its periphery a series of stud receiving pockets, another horizontal disk geared to the first named disk, and also having a series of peripheral depressions, a curved surface extending from adjacent the terminal of the conveyer way around the periphery of the receiving disk and in the direction of its movement, means for imparting intermittent rotational movements to the disks, and a finger and actuating devices therefor, operating to insure, after the delivery of a stud from the conveyer, the positive placing and retention thereof in the pocket, substantially as described.

16. In a stud setting machine the combination with a conveyer way and a setting mechanism of a pair of horizontal edge-contacting and gear-connected disks having series of peripheral pockets, and one having an axially extended stud with a ratchet wheel thereon, a sliding bar having thereon a pawl engaging the ratchet wheel, a wheel having a crank pin, and an operating lever having a connecting rod secured thereto and to a cranked portion of said wheel, substantially as described.

CHARLES E. VAN NORMAN.

Witnesses:
WM. S. BELLOWS,
J. D. GARFIELD.